Oct. 27, 1970 C. L. GARDNER, JR., ET AL 3,536,855

MAGNETIC INFORMATION TRANSFER APPARATUS

Filed Jan. 16, 1968 13 Sheets-Sheet 1

INVENTORS
CHARLES L. GARDNER
WALTER F. KLEIN
WILLIAM R. YOUNT

BY D. Kendall Cooper
ATTORNEY

MAGNETIC INFORMATION TRANSFER APPARATUS

Filed Jan. 16, 1968 13 Sheets-Sheet 4

Oct. 27, 1970 C. L. GARDNER, JR., ET AL 3,536,855

MAGNETIC INFORMATION TRANSFER APPARATUS

Filed Jan. 16, 1968 13 Sheets-Sheet 5

MAGNETIC INFORMATION TRANSFER APPARATUS

Oct. 27, 1970 C. L. GARDNER, JR., ET AL 3,536,855

MAGNETIC INFORMATION TRANSFER APPARATUS

Filed Jan. 16, 1968 13 Sheets-Sheet 11

United States Patent Office 3,536,855

Patented Oct. 27, 1970

3,536,855
MAGNETIC INFORMATION TRANSFER APPARATUS

Charles L. Gardner, Jr., Walter F. Klein, and William R. Yount, Lexington, Ky., assignors to International Business Machines Corporation, Armonk, N.Y., a corporation of New York Filed Jan. 16, 1968, Ser. No. 698,351
Int. Cl. G11b *5/86*
U.S. Cl. 179—100.2 24 Claims

ABSTRACT OF THE DISCLOSURE

The invention concerns apparatus for making duplicate copies of master record members, both the copies and masters having provision for storing information magnetically. In one embodiment, a master magnetic record is positioned in a predetermined location in the apparatus. Individual blank magnetic record members of comparable size are positioned coextensively with the master and pressure is applied to insure good contact between master and copy. Thereafter, a drum or belt mechanism having a plurality of permanent magnets positioned therein is moved rapidly adjacent the master and copy by manual scanning action. In one version, operation of a single control member applies pressure to the cards and drives the transfer mechanism. The mechanism imparts a large number of magnetic transitions as the drum or belt is moved past the surface of the media, the transitions effect transfer of the magnetic information pattern in the master to the copy. The coercivity of the materials is such that the magnetic field transitions established are strong enough to cause transfer of the information but not erasure of the master. In another embodiment, a master and copy are inserted simultaneously in the apparatus, the information is transferred and both master and copy are ejected simultaneously. Another embodiment contemplates mechanism in the apparatus for moving the transfer drum at relatively high speeds while concurrently moving the master and copy past the drum at relatively low speeds. In all versions, the transfer process is based on the establishment of a varying field strength that increases to a peak and then decays to zero. The apparatus is characterized by simplicity of construction and operation and performs the transfer process without electronic circuitry.

CROSS REFERENCE TO RELATED APPLICATIONS

The following applications are of interest:

U.S. patent application Ser. No. 606,173, E. Troy Hatley, inventor, entitled "Magnetic Duplicating Apparatus," filed Dec. 30, 1966, now abandoned, and now continuation case Ser. No. 861,204, filed Sept. 25, 1969.

U.S. patent application Ser. No. 698,294, F. E. Becker et al., inventors, entitled "Magnetic Copy System," filed concurrently herewith.

U.S. patent application Ser. No. 609,232, now U.S. Pat. 3,471,654, W. L. Dollenmayer, inventor, entitled "Transducer Driving Arrangement for Recording and Reproducing Apparatus," filed Jan. 13, 1967.

BRIEF BACKGROUND OF INVENTION, FIELD AND PRIOR ART

The field of the invention pertains to devices for effecting transfer of information, such as audio and digital information, that is stored in magnetic record masters to a plurality of copy media. Prior art devices for accomplishing this function have usually had provision for moving elongated master and copy record tapes past a transfer station, the station having some form of magnetic transfer device for establishing a high frequency alternating magnetic field or a direct magnetic field. An example of a device of this nature is set forth in the Herr Pat. 2,738,383. In such a device, the magnetic flux field generating means establishes lines of flux and the movement of the master and duplicate tapes through the field insures a multiplicity of flux transitions to effect transfer of information from master to duplicate.

In another prior art device, represented by the Hoshino Pat. 2,999,908, unitary magnetic record sheets are moved through a transfer station while pressure is applied by rollers. The transfer of information from master to duplicate is also effected by the movement of the media past the transfer station.

The Supernowicz Pat. 3,341,854 describes magnetic transfer apparatus for transferring information from a master record to a duplicate with expansion or compression of the information. A number of embodiments are described by Supernowicz, including one embodiment that makes use of unit magnetic record cards moved past a magnetic copy drum and having a rotating transfer transducer. The expansion or compression of the original information on the duplicate media is accomplished by establishing a speed differential with any two of the three primary elements involved, that is, the master record, the copy media, or the transducer.

The Hatley patent application Ser No. 606,173, now abandoned, previously noted, describes magnetic transfer apparatus making use of electromagnetic transfer means having a multiple-gap head energized so that adjacent poles are of opposite polarity. This insures a sufficient number of flux transitions and proper transfer of information regardless of the speed of the master tape and copy tape, which are drawn past the head gap.

As described in the various references noted, the transfer of magnetic information generally requires a master record media that has a higher coercivity than any of the copy record media. The transfer field established at the transfer station is selected within predetermined bounds that insure a sufficient field strength to effect the transfer of the information in the master to the duplicate media, without, however, erasing the master media. As an example, the Herr patent mentions a master coercive force in the range of 290–360 oersteds and a copy coercive force in the range of 220–290 oersteds. The maximum idealization field is controlled by the magnetic properties of the master media. With the ranges of coercive force just indicated, and particularly the range of 290–360 oersteds for the master media, satisfactory duplicate recordings are obtained with a maximum idealizing field of approximately 200–250 oersteds. In order to obtain a desired signal output, both the master and duplicate record media should have a fairly high remanence value, also, as for example, in the range of 500 gauss.

The Supernowicz Pat. 3,341,854 notes a master magnetic tape having a remanence value of 1,000–10,000 gauss and coercivity of 500–1,000 oersteds. The copy tape has a lower coercivity, for example, 100–500 oersteds.

To insure suitable transfer of the magnetic information, the media, both master and copy, are subjected to at least several cycles of alternating flux fields or transitions established by rapid movement of a permanent magnetic past the point of contact or tangency of master and copy. Herr found that frequencies in the range of 60 cycles per second to 120,000 cycles per second could be used for successful transfer. The movement of the media past the transfer station results in a gradual buildup of the field to a peak and a diminishing action as the media moves past and out of the transfer station. The diminishing action, that is, a diminishing flux field is the primary factor in the transfer process.

The principles of field transfer of magnetic information are made use of in the present invention by using, as examples, master documents with a coercivity of 600–800 oersteds and copy documents with a coercivity of 250–300 oersteds. Efficient copying has been observed to occur with as few as five to eight cycles of flux change.

SUMMARY

In accordance with the present invention, information transfer from master magnetic media to duplicate magnetic media is performed in a highly efficient manner with apparatus that is characterized by essentially mechanically or magnetically oriented structures arranged in a compact structure adapted for easy portability, maximum convenience, and primarily operator-oriented control of the various functions involved in the transfer operation. In a first embodiment, the portable unit receives a master card and a plurality of duplicate cards, in succession, the cards being comparable in size to the familiar IBM tab card, such cards having a magnetic oxide coating on at least one side. Prior to insertion of either a master or duplicate card, a handle on the unit is raised to release pressure means and to enable insertion of the record media. Means is provided for guiding the cards into the unit, accurately positioning them with respect to one another and in relation to the transfer means, and retaining them in accurate alignment during a transfer operation. Following insertion of the media, the handle is lowered to an operating position which applies pressure by means of a pressure pad over the entire card surfaces to insure intimate contact of the master and duplicate cards. After this, the operator moves a transfer control knob which effects a relatively high speed movement of magnetic structures over the surfaces of the cards during a single scanning or sweeping action to effect the transfer of information from the master to the duplicate card. Thereafter, the handle is raised and such action ejects the duplicate card, which now has a perfect magnetic copy of the original information stored in the master card.

Ordinarily, a master card is retained in the unit for use during a plurality of transfer operations with successively inserted duplicate cards. Eventually, when a new master card with a different signal pattern is desired, the master card presently in use is ejected by appropriate eject mechanisms in the unit. As envisioned in the present case, it is also possible to place the transfer mechanism under control of a single operator handle, thereby eliminating the transfer knob. That is, after insertion of an unrecorded duplicate in proximity to the master card in the unit, operation of the single handle applies pressure to the cards and subsequently trips the transfer mechanism to operate it across the cards, thereby effecting the desired transfer of information.

The transfer means in one embodiment comprises a drum divided into a predetermined number of segments, each segment being defined by an elongated permanent magnet slug or insert extending longitudinally of the drum. The drum is rotated at relatively high speed, its axis moving in parallel to the surfaces of the cards, and making peripheral contact in a predetermined plane and along a line of tangency with respect to the inserted cards. As the drum sweeps across the cards, the line of tangency moves across the cards as well. The relatively higher rotative speed of the drum insures a plurality of magnetic transitions established by the magnetic slugs in the drum surface at each point of tangency during the scanning action. The theoretical aspects of the transfer process are discussed in a later section of the present case.

One embodiment has a movable ledge feature that insures proper support for inserted cards, while enabling full insertion of the cards to the extent required.

Another version of the invention also provides a magnetic drum transfer means that is scanned manually across the surfaces of the inserted cards and a handle for applying pressure to the cards prior to a transfer operation. However, this version contemplates a simultaneous insertion of a master and duplicate card, as well as a simultaneous ejection, in contrast with the previous embodiment in which the master card is generally retained in position in the unit for an indeterminate length of time to facilitate the preparation of a large number of duplicate cards. That is the first version has separate duplicate and master retaining and ejection means in contrast with the second version.

In still another version, a belt conveyor means mounting a plurality of elongated bar magnets is provided for movement past the surfaces of the retained cards. The bar magnets are arranged with alternately adjacent magnetic poles which establishes the required magnetic transitions while the belt conveyor means moves past the card surfaces during a transfer operation.

In still another version, means is provided for driving a magnetic transfer drum havng a plurality of segmented magnetic inserts and for concurrently feeding the master and duplicate past the transfer drum as it rotates. The previous versions retain the master and duplicate cards in an essentially fixed predetermined location in the unit and a transfer operation is effected solely by rotary and linear movement of the transfer drum or belt past the surfaces of the retained media. In the version just referred to, the transfer drum is rotated while the master and duplicate cards are also moved past the drum.

In still another version of the invention, a feed belt is provided for moving the master and duplicate cards past a transfer station. In this case, the transfer station comprises a plurality of bar magnets arranged in succession, each magnet being positioned at a slightly greater distance from the contact surface of the media to establish a plurality of magnetic flux transitions from a relatively higher strength to a lower strength as the cards move past the station.

A number of versions are discussed herein at an appropriate place. As an example, one version comprises means for locating a master and duplicate card in a predetermined location in the unit and provides a transfer structure comprising a plurality of magnetic elements arranged end-to-end and linearly of the master and duplicate cards, and further having means for cycling the magnetic structure with a stepped incremental movement from a remote point away from the media into close proximity with the media, meanwhile moving the magnetic structure side-to-side, and thereafter performing the stepping and side-to-side movement while moving the magnetic structure again to the remote point. This establishes a desired number of transitions for the transfer operation.

OBJECTS

Accordingly, an object of the invention is to provide an operator-oriented magnetic transfer apparatus with simplified mechanisms and controls.

Another object of the invention is to provide magnetic transfer apparatus with essentially mechanical or magnetic structures, thereby minimizing the requirements for complex transfer structures and circuitry. However, the apparatus is adaptable for the inclusion of electronic circuits, if required.

Still another object of the present invention is to provide magnetic transfer apparatus for effecting transfer of information stored in magnetic unit record media to a plurality of duplicate magnetic record media.

A further object of the present invention is to provide a magnetic transfer apparatus that is predominately based on the use of permanent magnetic structures operated in a unique fashion to effect the information transfers required.

Also, another object of the invention is to provide magnetic transfer apparatus with semi-automatic alignment, retaining, pressuring, and ejecting facilities. In some cases, the facilities are combined for automatic operation to simplify the transfer routines.

A still further object of the present invention is to provide magnetic transfer apparatus that is characterized by simplified hardware and portability.

An additional object of the invention is to provide transfer apparatus that is completely cycled in response to actuation of a single control member.

The foregoing and other objects, features, and advantages of the invention will be apparent from the following more particular description of the preferred embodiments of the invention as illustrated in the accompanying drawings.

DESCRIPTION OF THE DRAWINGS

In the drawings:

FIG 8*a* is a cut-away left front perspective view of the device, while FIGS. 8*b*–8*f* represent a sequence of operations.

DETAILED DESCRIPTION OF FIRST EMBODIMENT

Figure 1A:
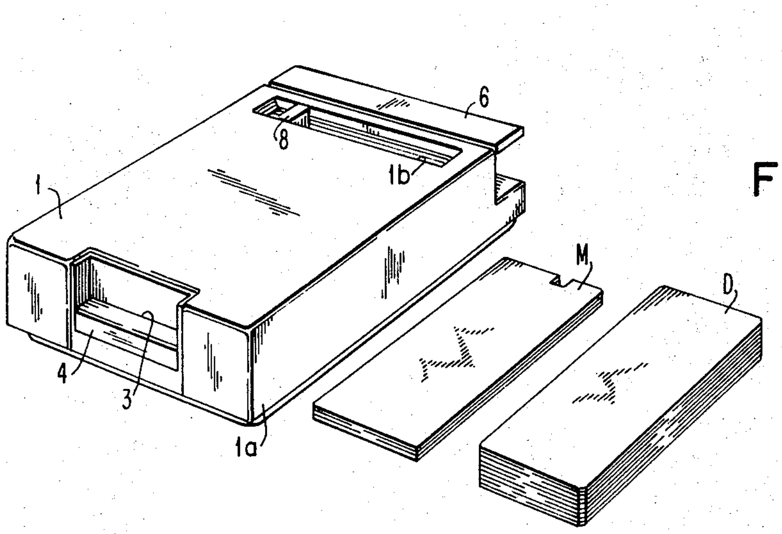
FIG. 1*a* is a left front perspective view of a first embodiment of the invention.
Figure 1B:
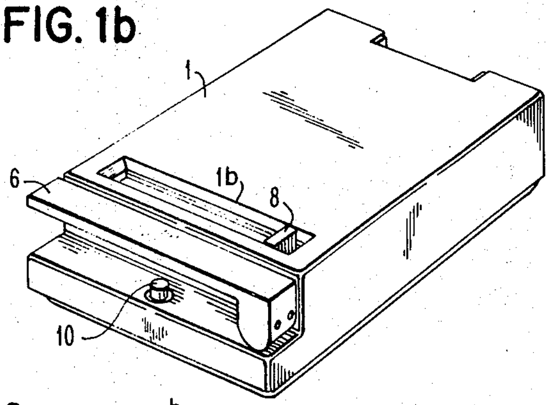
FIG. 1*b* is a right rear perspective view of the embodiment of FIG. 1*a*.

FIG. 1*a* represents a left front perspective view of a first embodiment of the duplicating apparatus according to the present invention, and FIG. 1*b* is a right rear perspective view of the first embodiment.

FIGS. 2*a*–7*b* show various structural features of the first embodiment with FIGS. 4*a*–4*h*, in particular, representing a sequence of operations in effecting transfer of magnetic signal flux patterns from master cards to duplicate cards. Referring to FIGS. 1*a* and 1*b*, the essential mechanical components of the apparatus are contained in a housing 1. It is assumed that front panel 1*a* faces the user during operation. Positioned next to the duplicating apparatus is a stock of master cards M having recorded information flux patterns, audio or digital in nature, and a second stack of duplicate cards D on which flux patterns from the master cards M are to be recorded by transfer sequences. The unit has a card insertion slot 3 with associated movable ledge 4. Operation of ledge 4 is particularly shown in FIGS. 7*a* and 7*b*. Arranged at the right end of the unit, is a handle 6 mounted for pivotal movement from the position shown to a raised condition shown in other views, such as FIG. 6*a*. When in the lowered position, handle 6 and associated mechanism establish proper pressure between a master card M and a duplicate card D to insure their close proximity for proper transfer of information.

Figure 3A:
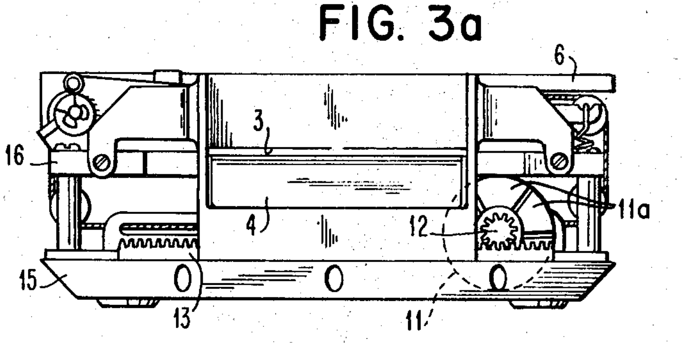
FIGS. 3*a*, 3*b*, 3*c*, and 3*d* represent left end, right end, front, and rear elevations of the unit of FIGS. 1*a* and 1*b*, with the cover removed.
Figure 3B:
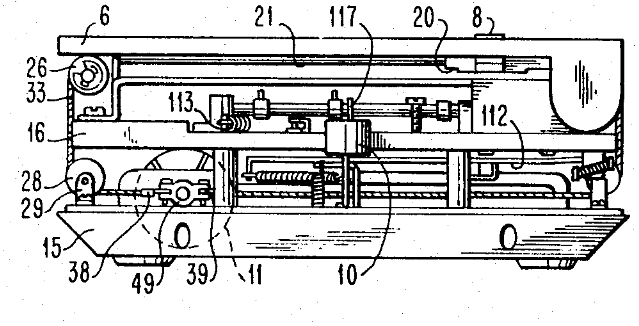
Figure 3C:
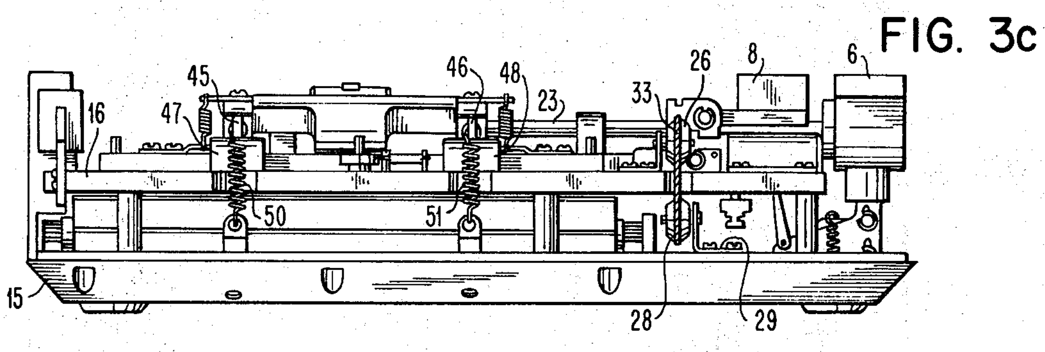
Figure 3D:
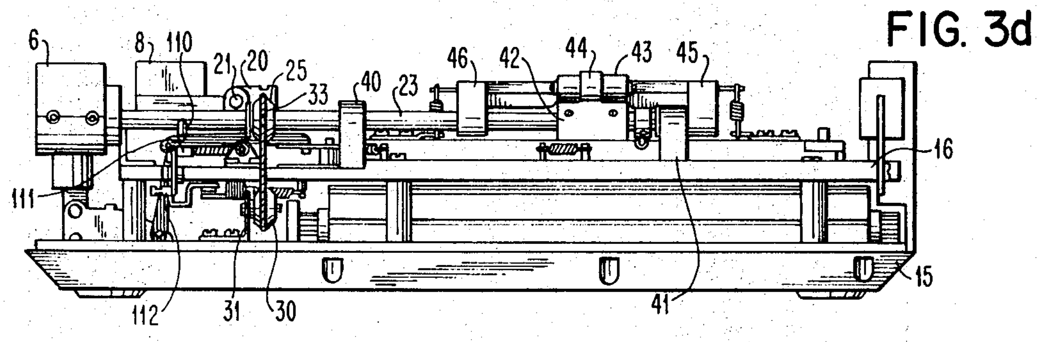

Positioned in an opening 1*b* of housing 1 is a transfer drum handle or knob 8. Handle 8 is arranged to move forwardly and backwardly in slot 1*b* to move the transfer drum in the unit in the opposite direction, that is, backwardly and forwardly. The unit also has a master card eject button 10. FIGS. 3*a*–3*d* are related plan elevations of the unit in FIGS. 1*a* and 1*b* with the cover 1 removed. FIG. 3*a* is a left elevation of the unit showing slot 3, ledge 4, and transfer drum 11. Drum 11 has a pinion gear 12 engaging a rack 13. FIG. 3*b* is an elevation of the opposite (right) end of the unit showing handle 6 and the opposite end of drum 11. This end of drum 11 also has a pinion gear engaging a rack similar to that shown in FIG. 3*a*. All of the figures, including FIGS. 3*a*–3*d*, show that the major components of the unit are supported by a base frame 15 and an intermediate frame 16.

Figure 2A:
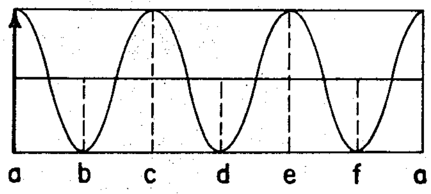
FIG. 2*a* is a waveform representing flux variations generated by a permanent magnet drum shown in FIG. 2*b*.
Figure 2B:
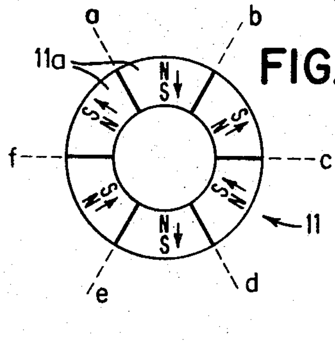

The pinion and rack relationship to the peripheral surface of drum 11 establishes a high speed movement of magnetic slugs 11*a* that are spaced at equal intervals in the drum structure, FIG. 2*a*. In the case illustrated, six slugs are provided. During a single movement of handle 8 from front to back or back to front, the gear relationships established insure sufficient transitions of the magnetic slugs across the width of the master and duplicate cards to transfer information, FIG. 2*a*. Only one movement, either front to back or back to front, is required to effect transfer of the information in the master card to the duplicate card. The movement of drum 11, by handle 8 is effected by a pulley arrangement shown particularly in FIGS. 5*a* and 5*b*. The pulley arrangement is also shown in the sequence views of FIGS. 4*a*–4*h*. Associated with handle 8 is a nylon bushing 20 mounted for sliding movement on a rod 21. Concentrically mounted on the same shaft 23 on which handle 6 is mounted is a slotted rubber roller 25. Another roller 26 is mounted by bracket 27 to intermediate frame 16. A third roller 28 is supported by bracket 29 on lower frame 15. A fourth roller 30 is supported by a bracket 31 on lower frame 15. The four rollers 25, 26, 28, and 30 are arranged in a vertical plane and accommodate a cord 33 that is attached by clips 35 and 36 to nylon bushing 20. Cord 33 is further attached by clips 38 and 39 to a hub 49 extending from the right end of drum 11. With the foregoing cord and roller arrangement, movement of drum handle 8 forwardly moves drum 11 rearwardly and the converse is true.

Extending vertically from intermediate frame 16 are bushing supports 40 and 41 for supporting shaft 23. Shaft 23 is mounted for free rotation within bushing supports 40 and 41 and rotative movement of handle 6 effects such rotation of shaft 23. Affixed to shaft 23 is a cam element 42 arranged underneath one extremity of a cross-shaped bail member 43. Contact of cam 42 with bail 43 is through roller bearing 44. Two other extremities of bail 43 are pivotally mounted in bail support members 45 and 46. Support members 45 and 46 are mounted at the rear extremities on shaft 23 that is freely rotatable therein and extend toward the front of the unit for support on upright members 47 and 48 that can best be seen in FIG. 3*c*.

Figure 6B:
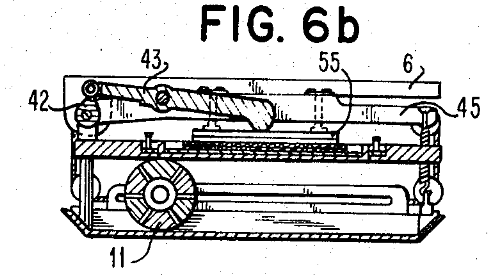
FIGS. 6*a* and 6*b* illustrate operation of the pressure pad in the unit of FIGS. 1*a* and 1*b*.
Figure 6A:
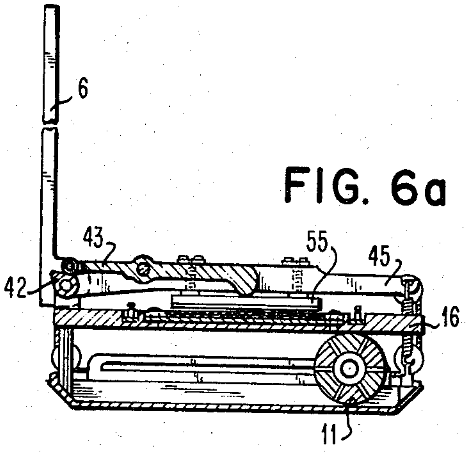

Springs 50 and 51 attached to lower frame 15 are engaged at their upper extremities with the forward extremities of bail support members 45 and 46 to maintain pressure on members 45 and 46 in a downward direction. FIGS. 6*a* and 6*b* illustrate the pivotal relationships of bail 43 and support members 45 and 46, particularly member 45, with handle 6 in a raised position (FIG. 6*a*) and in a lowered position (FIG. 6*b*).

Positioned underneath bail 43 is a pressure plate 55 with two rear extensions 60 and 61 and a forward extension 62. See FIG. 4*a*, especially. Extensions 60, 61, and 62 are drilled for free vertical reciprocation on stud elements 65, 66, and 67. Integral with plate 55 are bracket members 70–73 that are attached to plate 55 by screws. Brackets 70–73 have associated spring elements 75–78 extending upwardly for attachment to brackets 80 and 81 on support member 45 and brackets 82 and 83 on support member 46.

Cam member 42 is cut in such a manner that when handles 6 is in a lowered position, cam member 42 bears against roller 44 raising the rear extremity **43*a* of bail 43 and lowering the forwardly extending extremity 43*b* of bail 43 downwardly against pressure plate 55 and in opposition to the normal tension exerted by springs 75–78. Thus, pressure plate 55 moves downwardly on studs 65, 66, and 67** against a set of master and duplicate cards when positioned in the unit for a transfer operation.

Near the very end of the swing of handle 6 to its downward position, cam member 42 presses upwardly against bail 43 sufficiently to exert pressure by the pivotal connections of bail 43 with support members 45 and 46, thereby slightly raising support members 45 and 46 upwardly about their rotative mountings on shaft 23 and against the tension provided by the respectively associated spring elements 50 and 51. The somewhat larger clearance between pressure pad 55, ledge 4, and intermediate frame 16 is observable in FIG. 6*a* with handle 6 up. This enables insertion or removal of master and duplicate cards. In FIG. 6*b*, handle 6 is down and pressure plate 55 is exerting pressure against cards inserted in the unit.

TYPICAL OPERATION

Figure 4A:
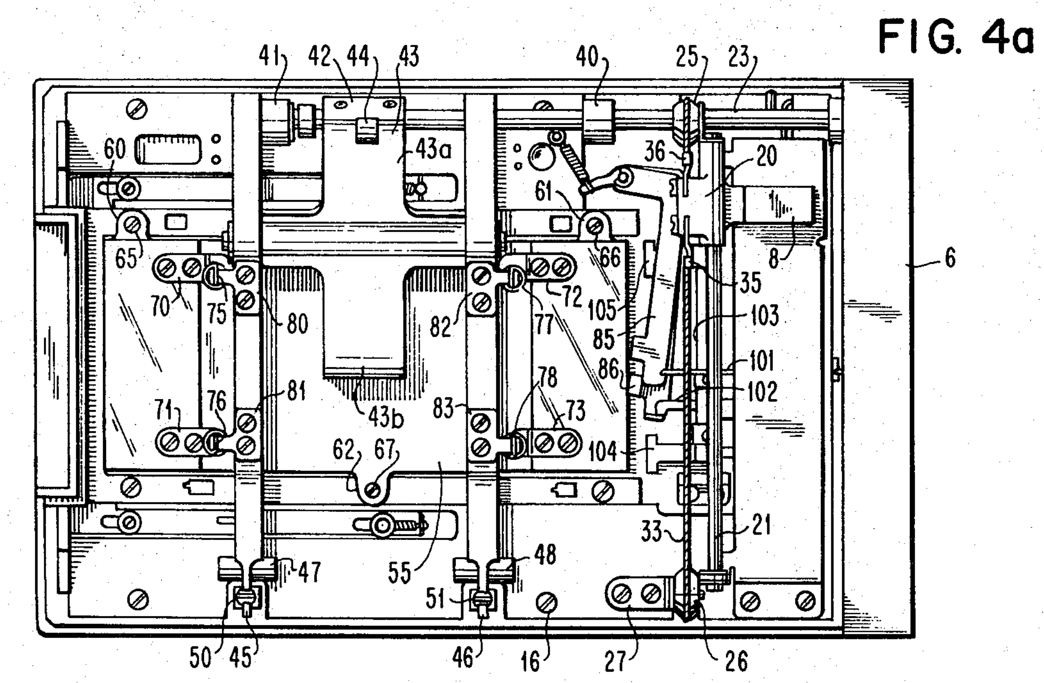
FIGS. 4*a*–4*h* are top elevations of the unit of FIGS. 1*a* and 1*b* with the cover removed and represent a typical sequence of transfer operations including entry of master card and duplicate card, movement of the transfer drum, and ejection of the duplicate card and master card.

FIGS. 4*a*–4*h* illustrate a typical sequence of operations of the unit for effecting transfer of a magnetic pattern from a master card to a duplicate card. All of these figures are top elevations of the unit in different stages of the operation. FIG. 4*a* represents the initial stage of the unit with the handle down, no cards inserted, the pressure plate engaged downwardly, and the drum knob 8 positioned toward the rear of the unit. Because of the pulley system previously described, this means that the drum or roller 11 is toward the front of the unit ready for movement toward the rear of the unit.

Figure 4B:
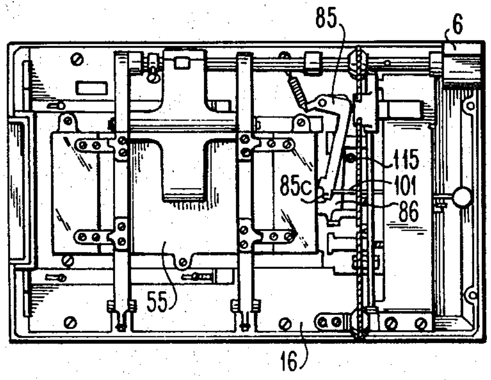

As a first step in the operation, handle 6 is raised to a vertical position as shown in FIG. 4*b*. This raises pressure plate 55 out of contact with the card bed formed in the intermediate frame member 16. At this time, the relationship of pressure plate 55 with ledge 4 and frame member 16 is shown in FIG. 6*a*.

Figure 4C:
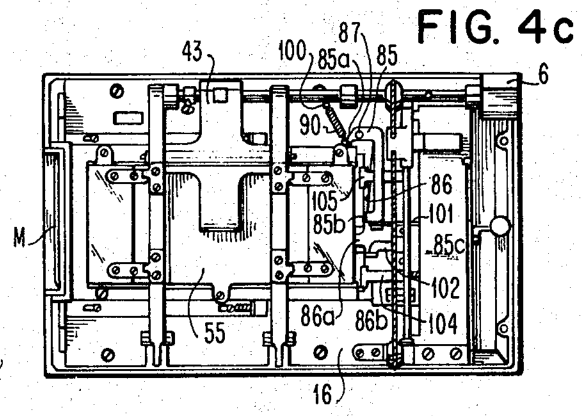

Following release of pressure plate 55, a master card with the oxide up is inserted in the unit from left to right as seen in FIG. 4*c*. The master and copy cards are adapted for cooperation with bell crank elements 85 and 86 that are pivotally mounted for rotation about a stud at 87. A spring 90 attached to frame member 16 by stud 100 exerts tension on an extension **85*a* of bell crank member 85 in a clockwise direction. Normal tension of extension 85*b***, therefore, *is* to the left in FIG. 4*c*. Bell crank member 85 is arranged to sense the presence of a master card in the unit and has an associated latch member 101 arranged to catch extension **85*c* of bell crank 85, when a master card is fully inserted. Member 86 has an extension 86*a* and a further extension 86*b* arranged for engagement with a latch 102** when a copy card is subsequently inserted. Since all of the master cards have notches appropriately provided at the innermost extremity FIG. 1*a*, any inserted master card will engage extension **85*b* of bell crank 85 to latch it under latch 101 but will not engage extension 86*a* of bell crank 86**, due to the notch location.

In FIG. 4*c*, master card M has engaged extension **85*b* of bell crank 85 latching it by latch 101. Latch 101 is affixed to a shaft 103 having extending card grippers 104 and 105. As soon as latch 101 drops down to latch extension 85*c* of member 85, shaft 103 rotates thereby carrying card grippers 104 and 105** downwardly to engage the top surface of master card M, thereby securely holding master card M in a steady condition.

Figures 7A, 7B:
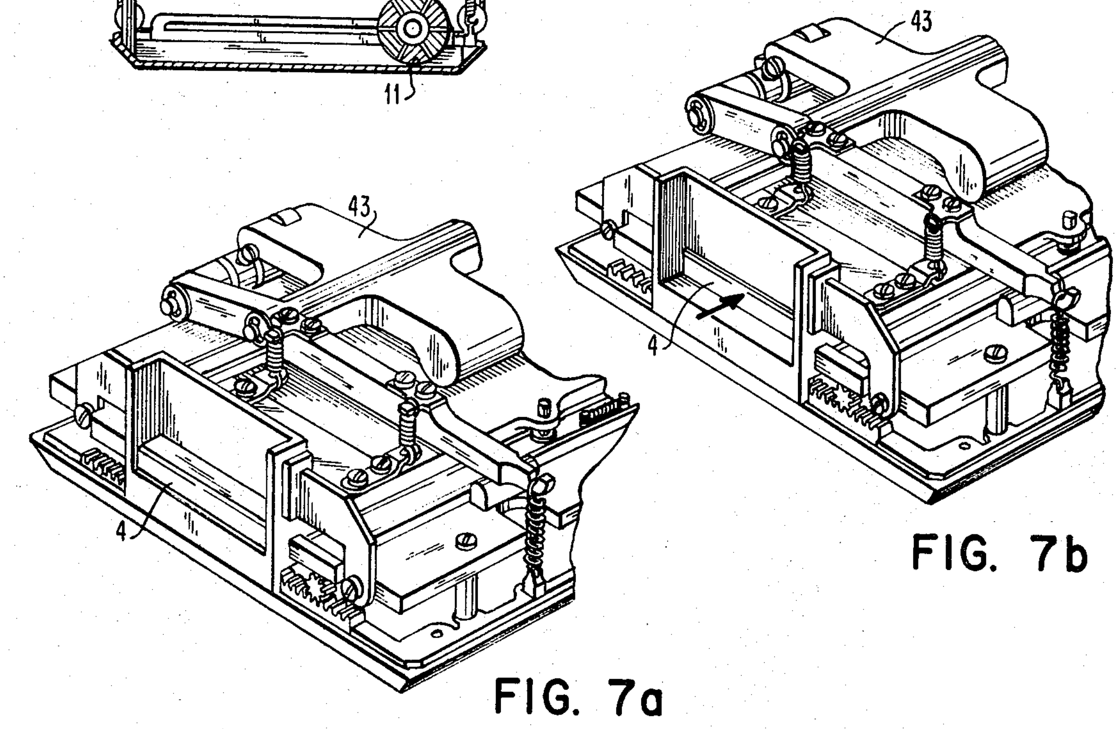
FIGS. 7*a* and 7*b* illustrate operation of a ledge feature of the embodiment of FIGS. 1*a* and 1*b*.

During insertion of either a master card M or a duplicate card D, ledge 4 initially supports the card or cards during movement into the apparatus but is movable inwardly from the condition shown in FIG. 7*a* to that shown in FIG. 7*b* to insure that the operator is able to fully insert the card or cards involved.

Figure 4D:
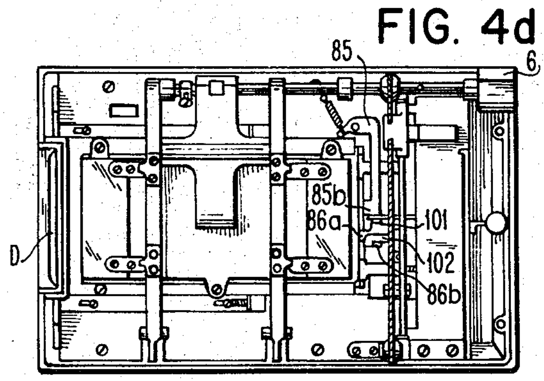

Following full insertion of master card M into the unit, a copy or duplicate card D is inserted in slot 3 on top of master card M and with the oxide down. FIG. 4*d* illustrates the condition of the unit with the duplicate card also in position. Since none of the duplicate cards D are notched, any inserted duplicate card will contact extension **86*a* of bell crank 86, moving bell crank 86 to the right for latching by latch element 102**. As shown in FIG. 4*d*, the arrangement of elements results in a slight displacement of the duplicate card from the master card to the extent of perhaps one tenth of an inch. This is done to insure scanning compatibility in a utilization device, such as the recording and reproducing apparatus disclosed in the Dollenmayer application, referred to above. The placement of the oxide surfaces of master and duplicate adjacent one another results in a mirror-image of the information pattern on the copy card. If not compensated for, this will require handling of master cards in a utilization device one way, and special handling of copy cards in another way. This is especially true when a Boutrophedonic pattern is used for storing information, that is a pattern involving scanning of the card in a first direction, stepping, scanning in an opposite direction, stepping, etc. This establishes a seqeuce of track segments that are alternately opposite in direction, such as 1, 3, 5, 7 etc., left to right scan, and 2, 4, 6, 8 etc., right to left scan. A mirror image of the tracks on a copy card in relation to the master card used as a source requires that scanning be just the reverse of that indicated and complicates the utilization device. In the embodiment of FIGS. 1*a*–7*b*, the copy card is displaced a convenient odd number of track segments so that subsequent scanning of the copy card is performed the same as a master card. This aspect of the apparatus is fully disclosed in the Becker et al. application.

Figure 4E:
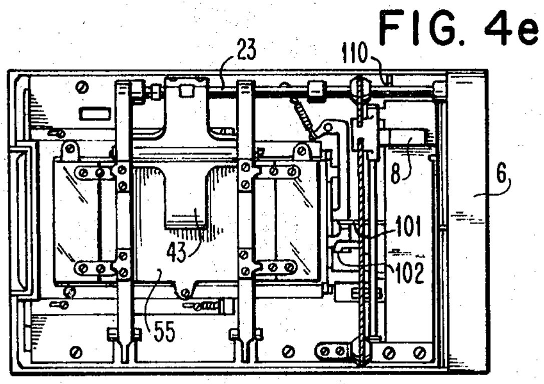

At this point in the operation, handle 6 is lowered as shown in FIG. 4*e*. This pivots bail 43 which, by the action previously described, moves pressure plate 55 down against the inserted master card M and duplicate card D.

Figure 4F:
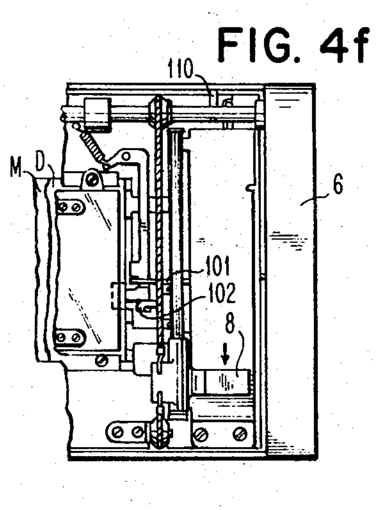

Subsequently, knob 8 is moved from the rear position shown in FIG. 4*e* to the front position shown in FIG. 4*f* which effects movement of the magnet roller from front to rear, as previously described. Drum 11 is rotated at relatively high speed and concurrently moved on its axis in a linear path adjacent the cards. Flux variations shown in FIG. 2*a* are thereby developed due to the arrangement of oppositely poled magnet segments **11*a***, FIG. 2*b*. The information contained in the master card is thereby transferred to the duplicate card and also retained in the master card for subsequent copying operations.

Figure 4G:
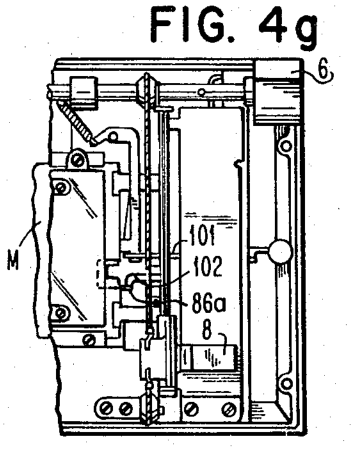

When the transfer operation has been completed, handle 6 is raised to the position shown in FIG. 4*g*. This accomplishes several things. Raising of handle 6 releases pressure on pressure plate 55 permitting free movement of the inserted cards. Also, raising of handle 6 ejects the copy card in the following manner. As can be seen most clearly in FIGS. 3*d*, 4*e*, and 4*f*, associated with handle 6 and projecting from shaft 23 is an eject stud 110. When handle 6 is raised to the position shown in FIG. 4*g*, stud 110 is moved downwardly against a projecting element 111 of a slide assembly 112 that is arranged for reciprocation from front to back, and back to front in the unit. Slide assembly 112 carries a pin 113, FIG. 3*b*, that is attached to one end of the latch member 102. Movement of slide assembly 112 toward the front of the unit rotates latch 102 clockwise in FIG. 4*g*, thereby unlatching bell crank 86 so that it moves to the left. Since extension 86*a* of bell crank 86 is in engagement with duplicate card D, movement of bell crank 86 to the left also moves card D to the left toward an eject position. The actual movement of bell crank 86 to the left is accomplished specifically by slide 112 moving a pin 115 that is more clearly seen in FIG. 4*b*. This occurs during the movement of slide 112 toward the front of the unit with pin 115 acting against bell crank 86 to move it to the left.

The production of numerous duplicate cards D is accomplished by repeating the insertion, transfer, and ejection operations illustrated in FIGS. 4*d* through 4*g*. While transfer operations take place, the master card remains in position as shown in FIG. 4*c*.

Figure 4H:
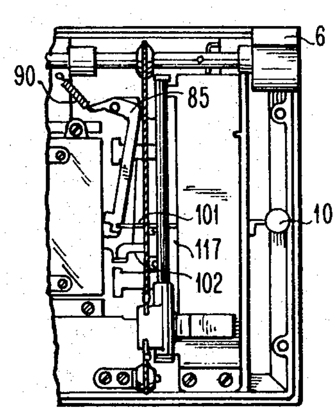
Figure 5A:
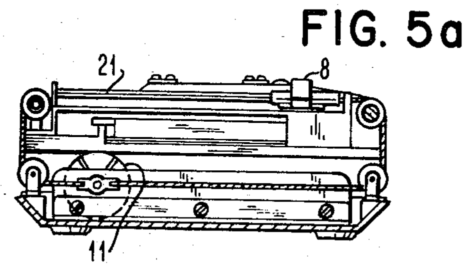
FIGS. 5*a and* 5*b* illustrate movement of the drum member in the embodiment of FIGS. 1*a* and 1*b*, and is related to the sequence of FIGS. 4*a*–4*h*.
Figure 5B:
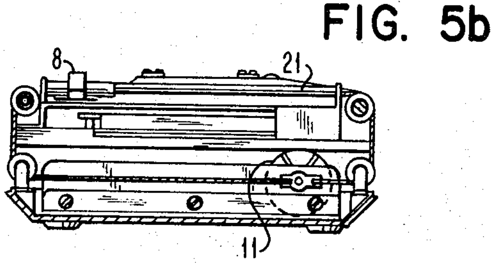

Eventually, a point is reached in the operation when a new master card is desired for transfer operations. At this time, master eject button 10 is depressed. Referring to FIG. 4*h*, depression of master eject button 10 releases bell crank 85 from latch 101. This is very simply effected by a link element 117 that is moved downwardly by eject button 10, thereby raising latch 101 and enabling bell crank 85 to rotate in a clockwise direction moving master card M to an eject position due to the tension exerted by spring 90. Master card M can then readily be removed from the unit and a new master card M inserted for subsequent operations.

DETAILED DESCRIPTION OF SECOND EMBODIMENT

FIGS. 8*a* and 8*b*–8*f* represent related versions of the invention wherein a master card and a duplicate card are inserted for a transfer operation and ejected simultaneously. The unit in FIG. 8*a* includes a housing 120 and an operating handle 121 for operating a support plate 123 against a pressure pad 124 to insure intimate contact of inserted master and duplicate cards. The cards are inserted together in a card slot 125. Projecting from one end of the unit is a drum operating knob 126 that is arranged to ride in a slot 127. Knob 126 is attached to a transfer drum 130 through a pinion gear 131 that is engaged with rack 132. Drum 130 has a desired number of permanent magnet inserts, similar to the first embodiment, and the principles of transfer are comparable to those illustrated in FIGS. 2*a* and 2*b*.

Figures 8A, 8B, 8C, 8D, 8E, 8F:
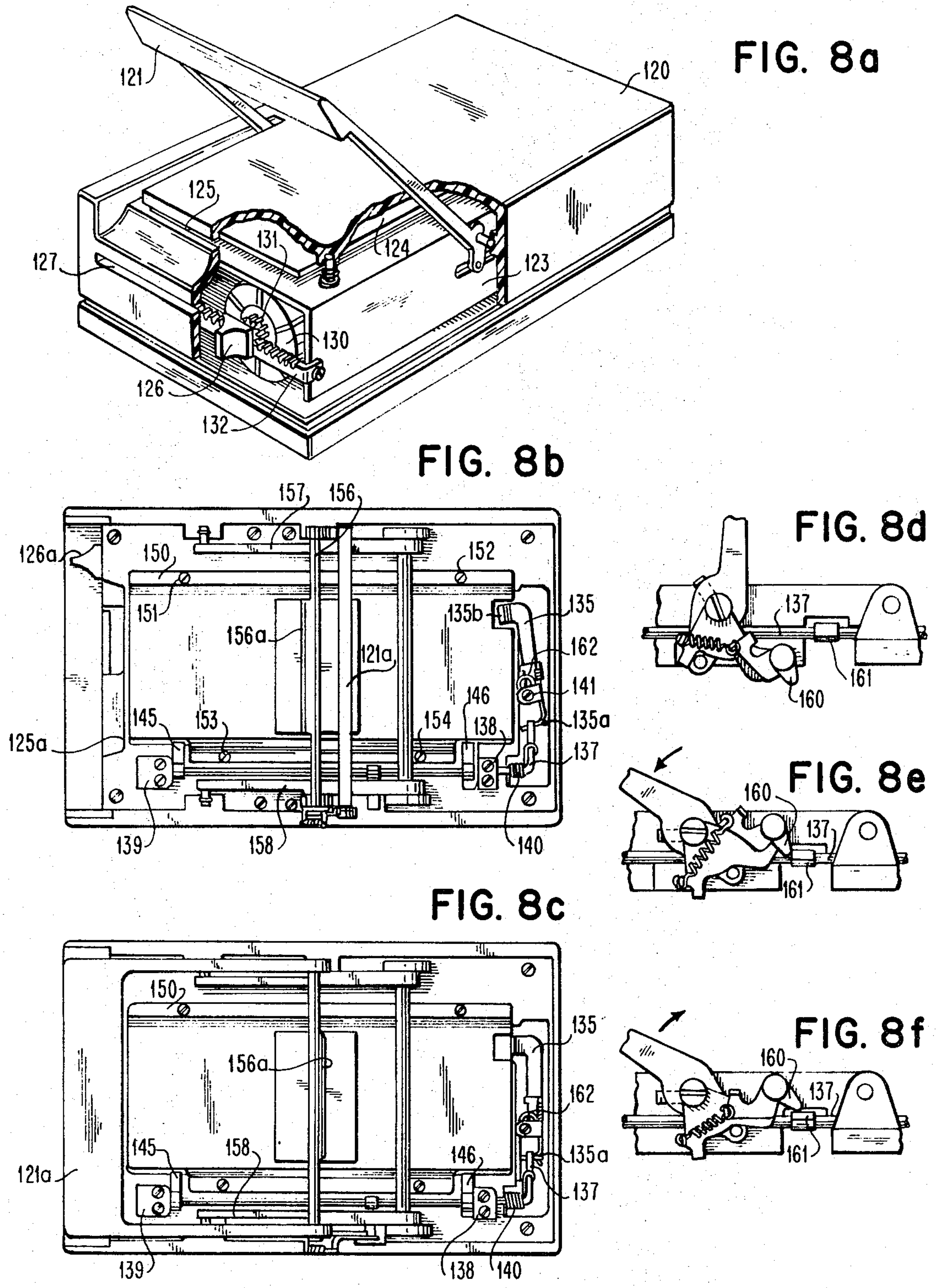
FIGS. 8*a*–8*f* represent another embodiment of the invention wherein a master and duplicate card are inserted and ejected simultaneously.

To operate the device, handle 121*a*, is raised to the vertical position such as in the similar unit shown in FIG. 8*b*. Knob 126*a* and associated drum 130*a* are assumed to be at the upper edge of the unit in FIG. 8*b* which is the rear of the unit. A master card and duplicate card are arranged in overlapping relationship and inserted in card slot 125*a*. Guide means are arranged to direct the cards toward a card sensing lever 135. Lever 135 has an extension 135*a* arranged for latching by a latch rod 137, mounted for pivotal rotation in support brackets 138 and 139. Latch 137 is biased downwardly toward extension 135*a* by a spring 140. When fully inserted, the cards encounter extension 135*b* of card sensing lever 135 and force it to rotate in a clockwise direction about pivot 141. This moves extension 135*a* to the left for latching by rod 137. Attached to rod 137 are spring fingers 145 and 146. Latching of rod 137 moves it downwardly toward the cards and also moves the spring fingers 145 and 146 against the cards.

Arranged above the inserted cards in the version of FIGS. 8*b*–8*f* is a pressure plate 150 mounted for vertical movement on studs 151–154. Handle 121*a*, in the version of FIGS. 8*b* and 8*c* is connected to a cam rod 156 that is pivotally supported in bracket members 157 and 158.

Pressure is applied by moving handle 121*a* to the downward position shown in FIG. 8*c*. This rotates cam portion 156*a* downwardly against pressure pad 150 thereby exerting pressure on the inserted cards.

To transfer the information from the master card to the duplicate card, knob 126*a* is moved toward the front of the machine which rotates drum 130*a* (not visible in FIG. 8*b* or 8*c*), underneath the surfaces of the cards. This transfers the information substantially as set forth in the first embodiment.

Associated with handle 121*a* is a trip finger 160, FIGS. 8*c*–8*f*, that contacts a spring element 161 extending from rod 137. As handle 121 is raised again to the condition shown in FIG. 8*b*, trip 160 is moved downwardly against extension spring 161, FIG. 8*f*, rotating rod 137 up out of the path of extension 135*a* and permitting card sensing lever 135 to move counterclockwise back to its normal inactive position shown in FIG. 8*b*. This occurs due to bias exerted by a spring member 162. The movement of lever 135 forces both the master and duplicate cards to the left in FIG. 8*b*, which is the eject condition.

At least one variation is noted between the unit shown in FIGS. 8*a* and that shown in 8*b* and 8*c*. In FIG. 8*a*, handle 121 moves supporting bed 123 up against pressure pad 124, but in FIGS. 8*b* and 8*c* handle 121*a* moves pressure pad 150 downwardly against the inserted cards.

THIRD EMBODIMENT

Figures 9A, 9B, 9C, 9D:
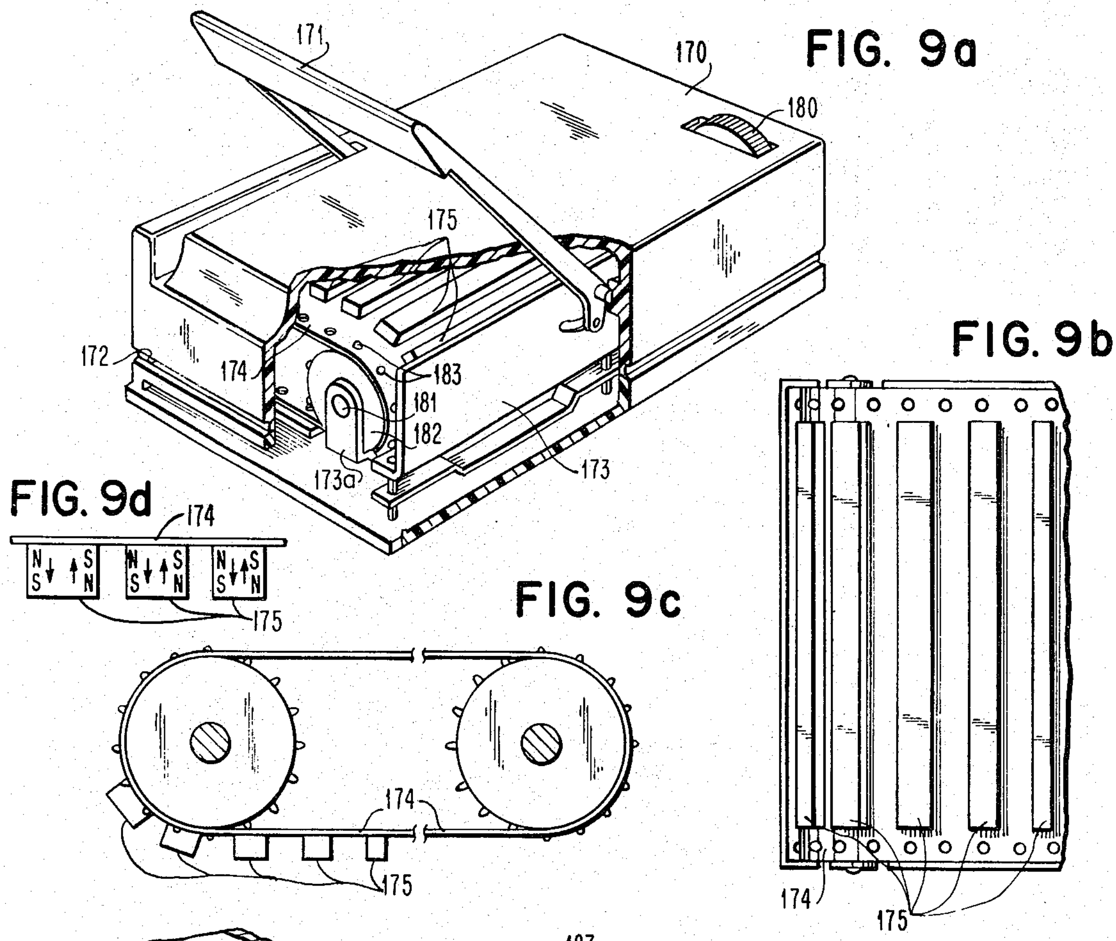
FIGS. 9*a*, 9*b*, 9*c*, and 9*d* represent a belt version of the invention, the belt mounted for movement past inserted magnetic cards and having a series of magnetic slugs mounted a regular intervals thereon.

FIGS. 9*a*, 9*b*, 9*c*, and 9*d* illustrate a third embodiment of the invention, involving a moving belt with a plurality of magnetic slugs mounted thereon. Referring to FIG. 9*a*, the unit has a housing 170 with projecting handle 171 for applying pressure to inserted cards as in the other embodiment. A card slot 172 receives master and duplicate cards. Movement of handle 171 downwardly applies pressure to the cards through the member 173. Mounted for movement within the confines of member 173 and supported by bracket 173*a* is a belt 174 having a plurality of permanent magnet slugs 175 mounted transversely across it for movement in proximity to any inserted cards. Five slugs 175 are provided of progressively smaller size, and arranged from largest to smallest to pass inserted cards in sequence. The magnetic flux orientations of slugs 175 are as shown in FIG. 9*d*.

In operation, movement of handle 171 to the extreme downward position moves bracket assembly 173 downwardly against the inserted cards. Following this, the operator rotates knob 180 which is mounted concentrically internally on shaft 181 that is supported by bracket 173*a*. Also mounted on shaft 181 is a pin wheel 182 that engages apertures 183 in belt 174. As is evident, rotation of knob 180 will move belt 174 linearly past the inserted documents. Such movement of belt 174 carries magnet slugs 175 in sequence past the documents, thereby creating a sequence of flux transition which effects the transfer of information according to the principles previously discussed.

OTHER VERSIONS

Figure 10:
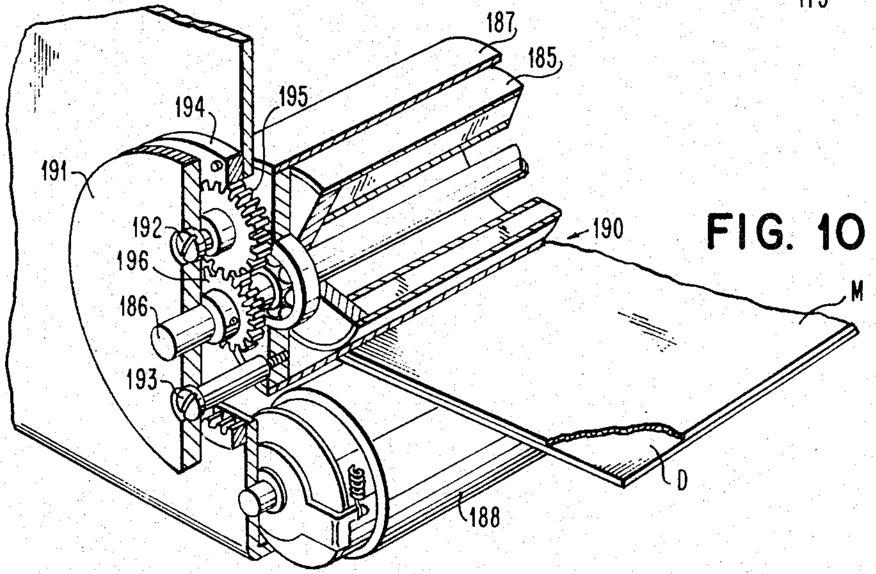
FIG. 10 illustrates still another version of the invention involving rotation of a transfer drum in a relatively fixed location and movement of master and duplicate past the drum by roller mechanisms.

FIG. 10 illustrates a version of the present invention that contemplates the rotation of a transfer drum 185 at a relatively rapid rate about shaft 186. Transfer drum 185 is housed internally of a drive roller 187 positioned for contact with a pressure roller 188. A master and duplicate card are inserted for movement between rollers 187 and 188 at their point of tangency 190.

Mounted on roller 187 is a drive knob 191 attached by screws 192 and 193. Drive knob 191 carries a ring gear 194 engaging a planetary gear 195 and a sun gear 196 that is concentrically mounted on shaft 186.

The arrangement provides a multiplication factor to drive transfer drum at a rate that is relatively higher than the rate of movement of the cards past the tangency point 190. To operate the apparatus, drive knob 191 is rotated in order to drive gear 196 and drum 185 at the required transfer speed. Concurrently, as a result of the attachment by screws 192 and 193, rotation of knob 191 effects rotation of the roller 187 and due to contact through an inserted master and duplicate card also turns the pressure roller 188. Transfer drum 185 has a plurality of permanent magnet inserts or segments, such as those shown in FIG. 2*b*, that, due to the rapid rotation, create a series of flux transitions at the point of tangency as at FIG. 2*a*, to effect the transfer of information from the master card M to the duplicate card D.

PROGRESSIVELY POSITIONED MAGNETS

Figure 11A:
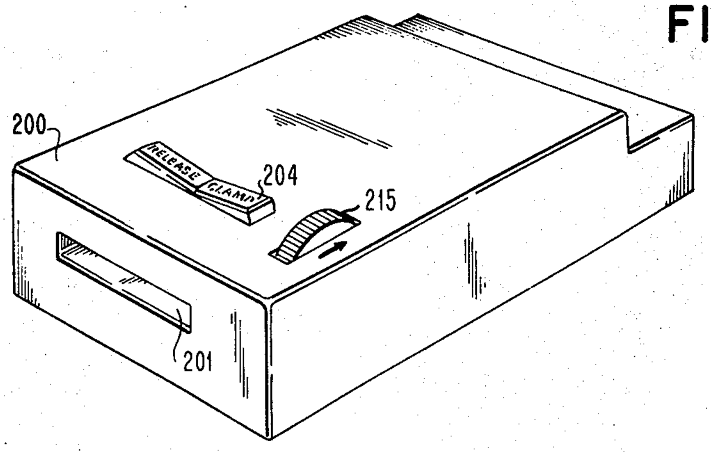
FIGS. 11*a* and 11*b* represent an embodiment having a belt feed mechanism for moving a master and duplicate card past a transfer station comprising a series of bar magnets arranged in progression to exert successively higher to lower strength fields and transistions for effecting transfer of information.
Figure 11B:
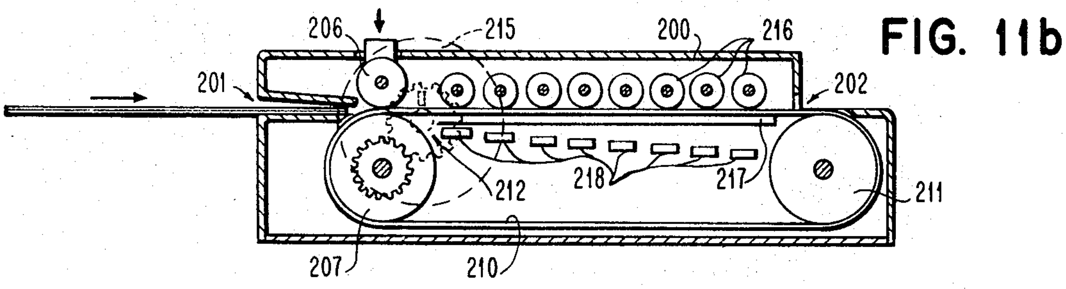

FIGS. 11*a* and 11*b* illustrate a version of the invention wherein the master and duplicate cards are drawn past a transfer station comprising a plurality of bar magnets arranged in sequence and successively positioned at a somewhat greater distance from a plane of movement of the cards. The unit 200 has a card entry slot 201 and a card exit slot 202. The pressure bar 204 serves to release and exert (clamp) pressure on inserted cards by operating a pressure roller 206 down into contact with a roller 207 just inside the card entry. The device uses a belt 210 mounted on rollers 207 and 211 for continuing movement in relation to a transfer station 212. Belt 210 is moved by rotation of either roller 207 or 211 with which it is engaged and particularly by operator rotation of a rotary control knob or dial 215.

Positioned at the transfer station 212 is a series of pressure rollers 216 that are arranged above the path of movement of the cards. Positioned underneath the path of movement of the cards is a support member 217 that carries a succession of bar magnets 218. As illustrated, the bar magnet closest to entry 291 is also physically positioned closer to the plane of movement of the cards as they pass through the unit and each bar magnet is positioned at a progressively greater distance from the plane of movement.

During operation, the arrangement of magnets is such that higher strength transitions are encountered by the cards as they move through the unit near entry 201 and the transistion progressively diminish as the cards near exit 202. This insures a suitable transfer field for effecting transfer of the information.

THEORETICAL PRINCIPLES AND ADDITIONAL EXAMPLES

FIGS. 12*a*–12*i* illustrate the theoretical principles of the transfer process and additional illustrative embodiments. The structures previously discussed are primarily intended to avoid the necessity for having complex and expensive equipment such as electro-magnets, transformers, power supplies, amplifiers, oscillators, etc. However, the arrangement of structures is such that the alternating flux changes required are provided in a simplified and inexpensive manner. In the various versions of the invention, the permanent magnet transfer means is arranged to provide enough phase reversals with sufficient magnitudes so that relative motion between the master-copy interfect and the magnetic field has the same effect as an alternating field. For most effective transfer of information, the copy material should enter the field beginning at zero strength and increasing in magnitude to a peak strength that is strong enough to produce copying, but not strong enough to erase the master. The field should then decay over a minimum number of cycles to a zero value.

Figure 12A:
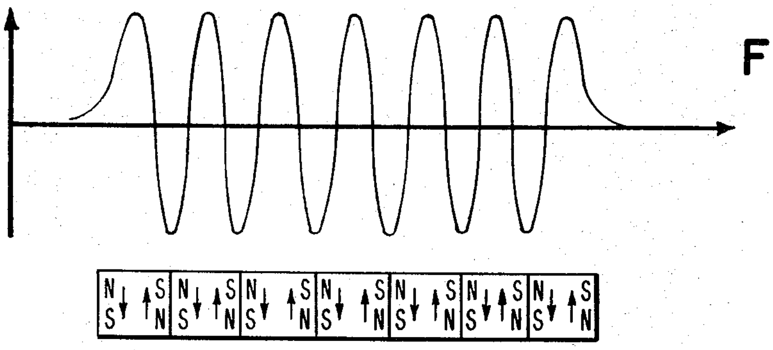
FIGS. 12*a*–12*i* illustrate various principles of operation in the apparatus together with a number of suggested variations.

In FIG. 12*a*, a series of permanent magnets is placed end-to-end with the south pole of one magnet adjacent the north pole of the next, and so on. The flux reversals are illustrated by the wave form.

Figure 12B:
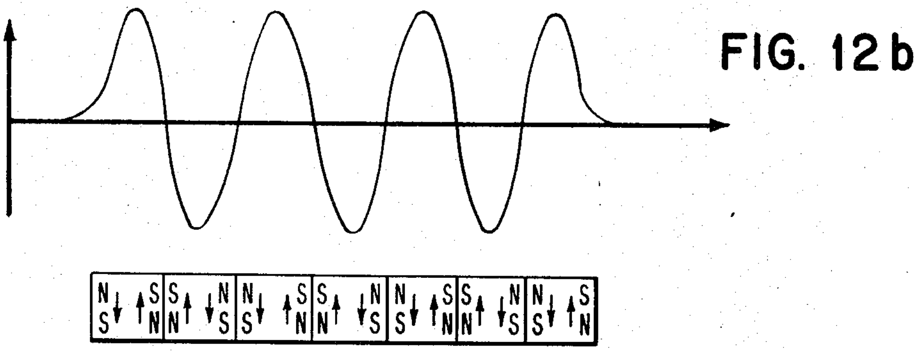

FIG. 12*b* shows the series of magnets arranged end-to-end with like poles adjacent one another. The arrangement of FIG. 12*a* provides twice the number of phase reversals as that shown in FIG. 12*b* but the field strength at a given level away from the magnets is less in FIG. 12*a*.

Figures 12C, 12D, 12E, 12F:
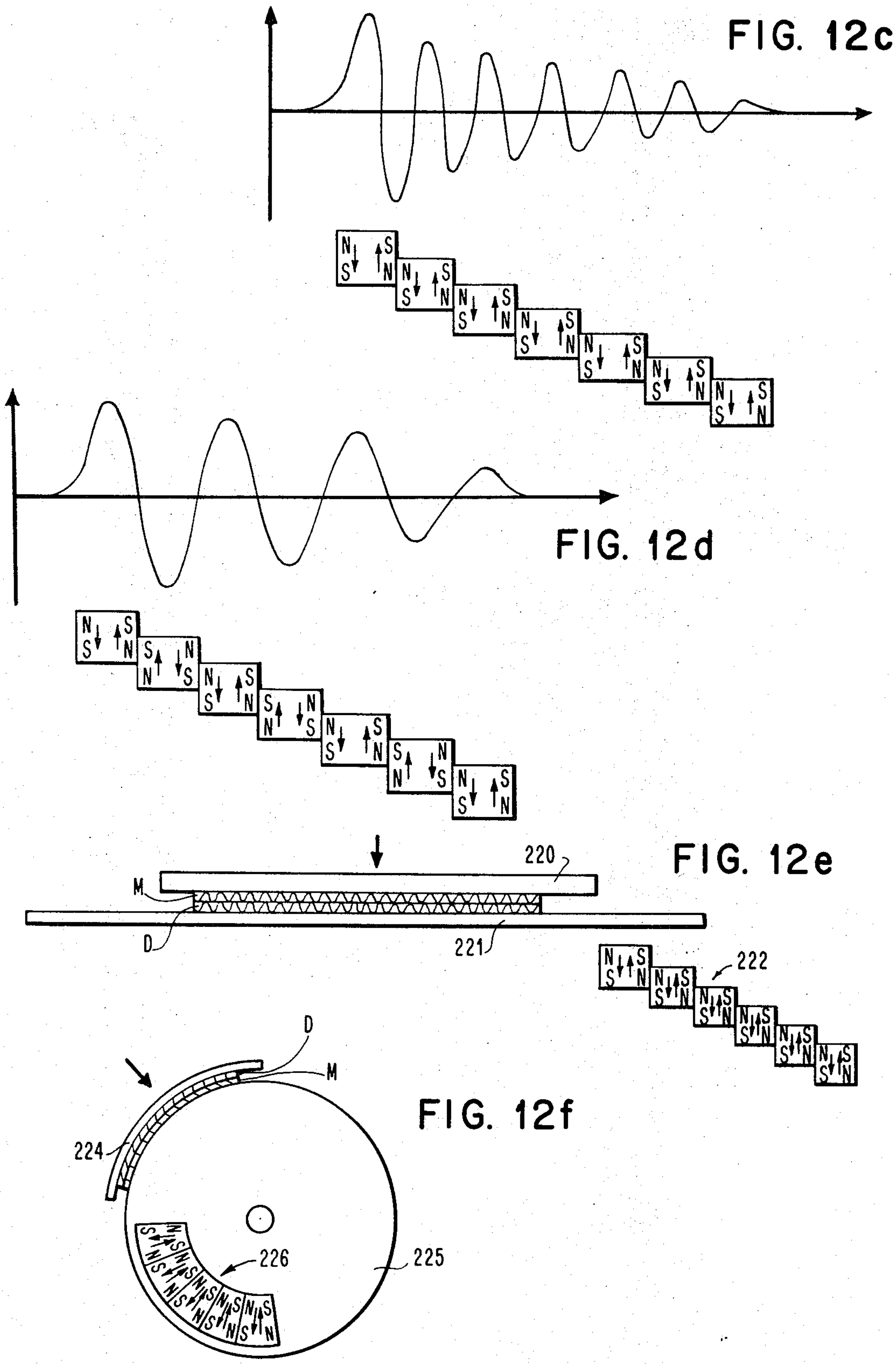

FIG. 12*c* shows a stepped arrangement of magnets such as that discussed in connection with FIG. 11*a* and 11*b* that provides a peak field followed by a decaying field for a fixed level above the magnets. The arrangement of magnets with respect to adjacent poles in FIGS. 12*c* and 12*d* are comparable to the arrangements shown in FIGS. 12*a* and 12*b*, respectively. In some cases, an increasing field may be desired preceding the peak magnitude and in such event, the same stepping arrangement can be provided. The stepping of the field can be provided by varying the distance of magnets having equal strength or by providing magnets with varying strength positioned linearly and in parallel to the path of movement of the record media. The magnetic structures can be fulfilled by individual two-pole magnets, or by sheets or cylinders of magnetic material with alternating poles in the material as has been described, particularly in connection with the first embodiment of the invention. The arrangement of magnets provides the same transfer field effect as more complicated structures, such as electro-magnets driven to produce an alternating field.

The version in FIG. 12*e* assumes the master and copy cards are retained in position by a pressure plate 220 cooperating with a support plate 221. Once positioned, the series of permanent magnets 222 is relatively moved past the master and copy cards to transfer the information.

FIG. 12*f* shows a pressure plate 224 pressing a master and copy card against a cylinder 225 and having a series of permanent magnets 226 that are rotated internally to produce the desired transfer field. The magnets 226 can be rotated past the cards or the pressure plate 224, cards, and cylinder 225 can be rotated past the permanent magnets 226.

Figure 12G:
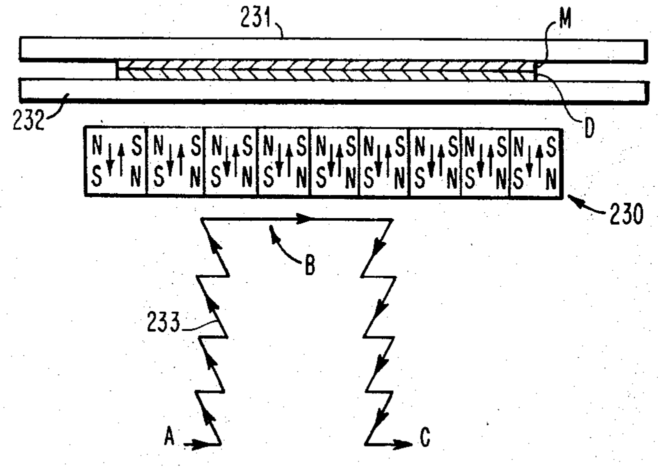

FIG. 12*g* illustrates still another version wherein a series of permanent magnets 230 are positioned adjacent a master card and copy card with an associated pressure plate 231 and support plate 232. The arrow sequence 233 illustrates a technique for effecting transfer. The technique involves moving magnets 230 from point A in a zig-zag fashion to establish alternating flux transitions from a minimum to a peak value at point B and thereafter again moving the magnets 230 in a zig-zag fashion to point C. With this technique, as the magnets make each step in approaching the master card and copy card, each particle along the master-copy interface is taken through at least one complete flux change from zero to positive from zero to negative to zero. Moving the magnets horizontally establishes an alternating field while moving the magnets closer produces an increasing field strength. Thereafter, the magnets are moved away from the cards in a similar pattern. Thus, the master-copy interface experiences an alternating field of increasing and then decreasing magnitude.

Figure 12H:
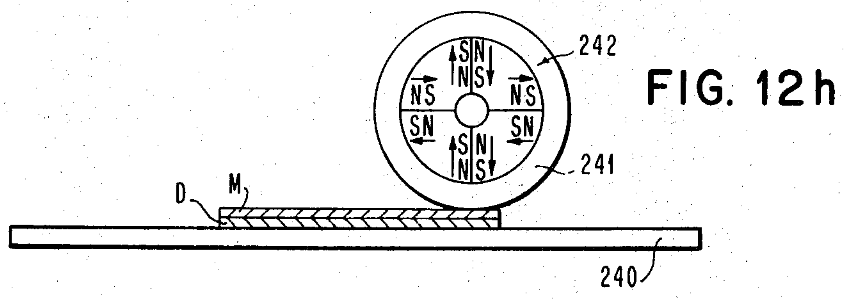

FIG. 12*h* illustrates a version having a support plate 240 for supporting a master card and copy card. A pressure roller 241 contains a sequence of permanent magnets 242. Magnets 242 rotate with roller 241 but at a faster rate. In this version therefore, roller 241 serves to exert pressure on the cards and supports the magnet field structure. The master-copy interface experiences alternate flux changes from zero to positive to zero to negative to zero, etc.

Figure 12I:
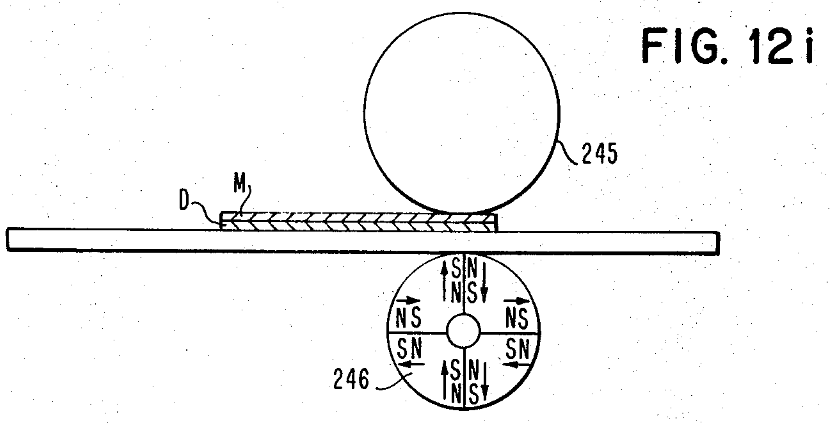

FIG. 12*i* illustrates a slight variation with a pressure roller 245 and a permanent magnet roller 246 mounted in an opposite location to roller 245.

Another possibility includes the provision of a magnet cylinder with adjacent poles of different strengths. As a given point on the master-copy interface passes through the area of pressure created by the pressure roller, it experiences an alternating field of varying strength. A varying strength field can also be created by taking advantage of the fact that the field strength varies with distance away from the magnets. This can be done by having a cylinder of magnets with equal magnitude poles and properly placing the magnets so that the in position of a point on the master-copy interface varies in distance from the magnets as it crosses the area of pressure created by the pressure rollers.

SINGLE CONTROL FOR ENTIRE TRANSFER CYCLE

FIGS. 13, 14*a*–14*c*, 15*a*–15*c*, and 16*a*–16*c* illustrate still another embodiment of the invention wherein a single control handle effects a complete transfer cycle including operation of a card pressure pad and required movement of the transfer drum. This embodiment is somewhat similar to the first embodiment described in connection with FIGS. 1*a*–7*b*.

Figure 13:
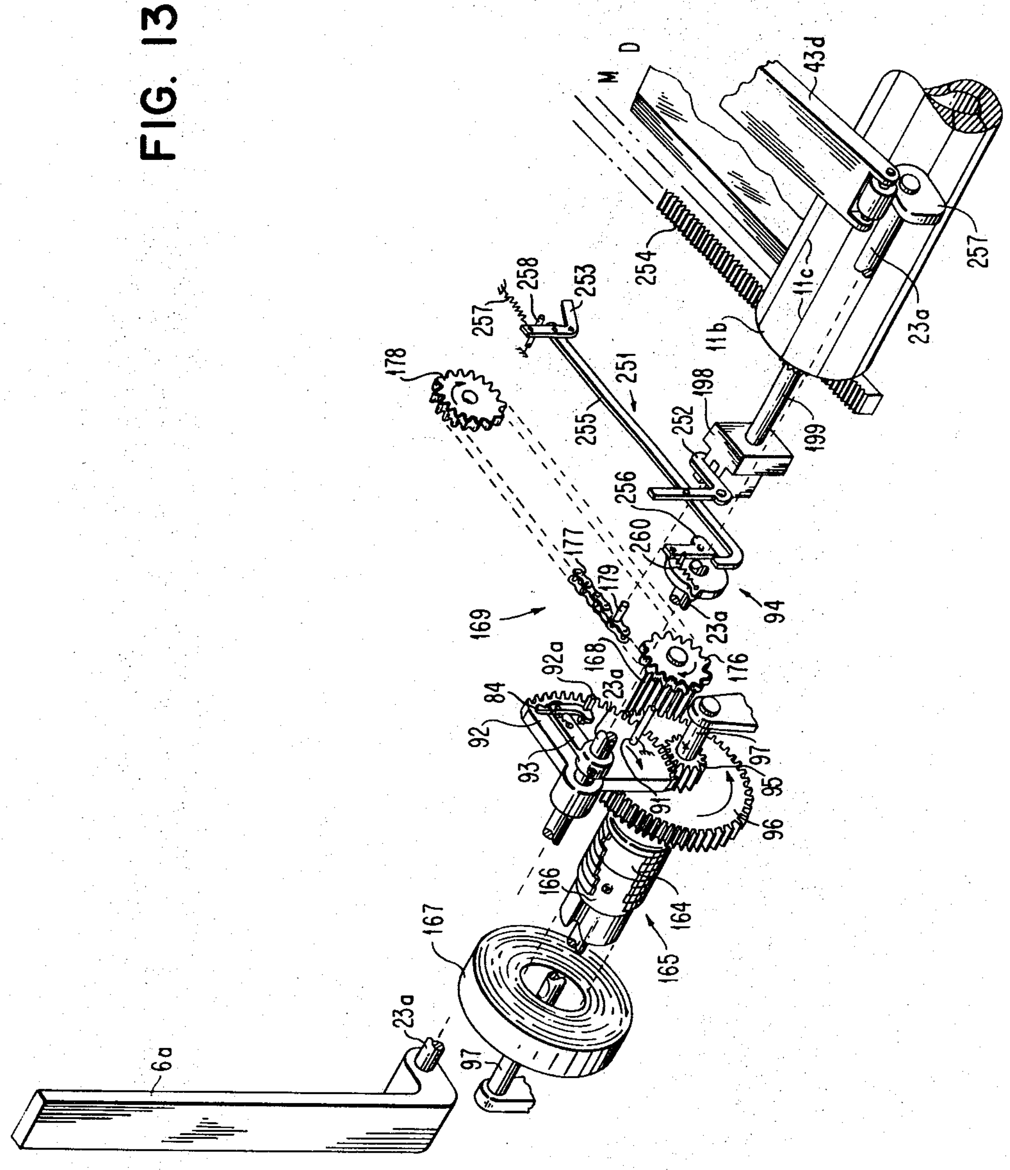
FIG. 13 illustrates an embodiment wherein operation of a single control handle applies pressure and cycles a transfer drum past the media, thereby simplifying operation.

Handle 6*a*, FIG. 13, is raised in the usual manner to enable insertion of a master card M and a duplicate card D. Following card insertion, handle 6*a* is moved downwardly. Such movement winds up a one-way spring clutch applies the pressure pad, and releases the clutch to drive the transfer drum once across the cards. FIGS. 14*a*–14*c*, 15*a*–15*c*, and 16*a*–16*c* respectively, illustrate significant events during movement of handle 6*a* as it reaches 10°, 5° and 0° with respect to its ultimate horizontal position. It is probable that housing 1 would be slightly larger to accommodate the additional mechanisms.

Handle 6*a* is attached to shaft 23*a* that carries gear sector 92 with pin 92*a*, arm 93, latch trip dobber assembly 94 and pressure pad cam 257. Sector 92 is free to rotate on shaft 23*a*. The others are affixed thereto. Associated with arm 93 is a latch 84 and a release pin 91 that is "grounded" to frame. Sector 92 is engaged with gear 95 that is associated with larger gear 96. Gear 95 is freely mounted for rotation on shaft 97. Shaft 97 is supported by bushings 98 and 99. Gear 96 has an associated hub 164, and both are free to rotate on shaft 97. Hub 164 forms part of a one-way spring clutch assembly 165 having a spring wind up hub 166 affixed to shaft 97.

A coil spring 167 has its inner end connected to hub 166 and its outer end grounded. Engaged with gear 96 is another gear 168 and sprocket 176 that serve to drive a chain-link assembly 169 including chain-link 177. Chain-link 177 is further supported for movement by sprocket 178 and carries a drive pin 179 normally engaged with drive block 198. As shown, block 198 is connected by shaft 199 directly to transfer drum 11*b*, the latter having magnetic slugs 11*c*. As in the first embodiment described, drum 11*b* need be moved only from front to back or back to front of the unit to effect transfer of information. Drum 11*b* has, in effect, a bistable or toggle kind of movement. Latch assembly 251 with latches 25*a* and 253 serves to maintain drum 11*b* at one end or the other of its run in rack 254 and is released at an appropriate time to enable drum movement. Latch assembly 251 further includes slide 255 controlled by dobber arm 256 and spring 257 that retains latch assembly 251 against stop 258.

Just prior to release of the drive for drum 11*b*, cam 257 raises arm 43*d* that compares with extension 43*a*, FIG. 4*a*, for applying pressure to cards M and D through mechanisms such as those particularly shown in FIGS. 6*a* and 6*b*.

Figure 14A:
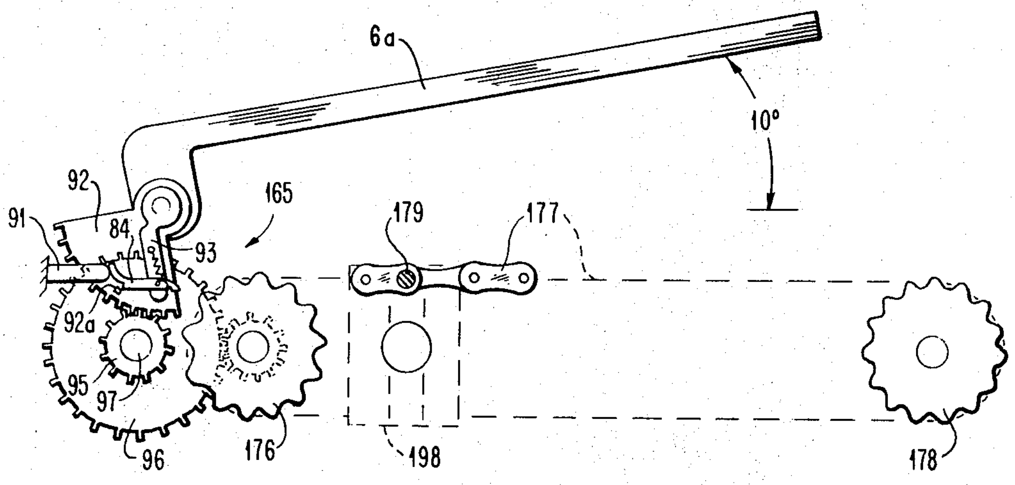
FIGS. 14*a*–14*c*, 15*a*–15*c*, and 16*a*–16*c* show a sequence of operations for their embodiment.
Figure 14B:
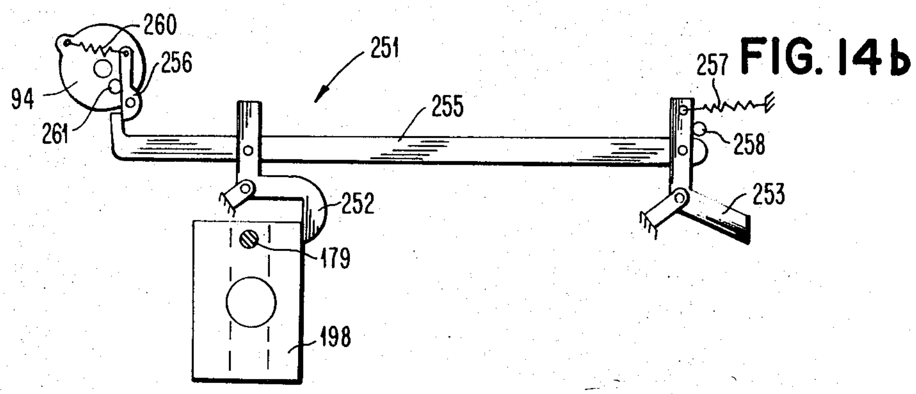
Figure 14C:
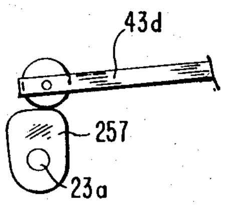

Operation of the single control embodiment is understandable by reference to sequence FIGS. 14*a*–14*c* (10°); 15*a*–15*c* (5°); and 16*a*–16*c* (0°). As handle 6*a* is moved downwardly by the operator, the greater portion of the 90° angular movement from vertical to horizontal positions is used to wind up spring clutch 165 and raise arm 43*d* to apply pressure to cards M and D. Sector 92 is driven through cooperation of pin 92*a* with latch 84. This winds up spring 167 due to the connection of gears 95 and 96 and hub 166.

In FIG. 14*a*, about 10° from horizontal, latch 84 strikes grounded pin 91 and the driving connection to sector 92 through pin 92*a* is released. However, clutch 165 remains wound up for a few degrees until latch assembly 251 is released. It is still latched at 10°, FIG. 14*b*. Meanwhile, cam 257 raises arm 43*d* to apply pressure on the cards, FIG. 14*c*.

Figures 15A, 15B:
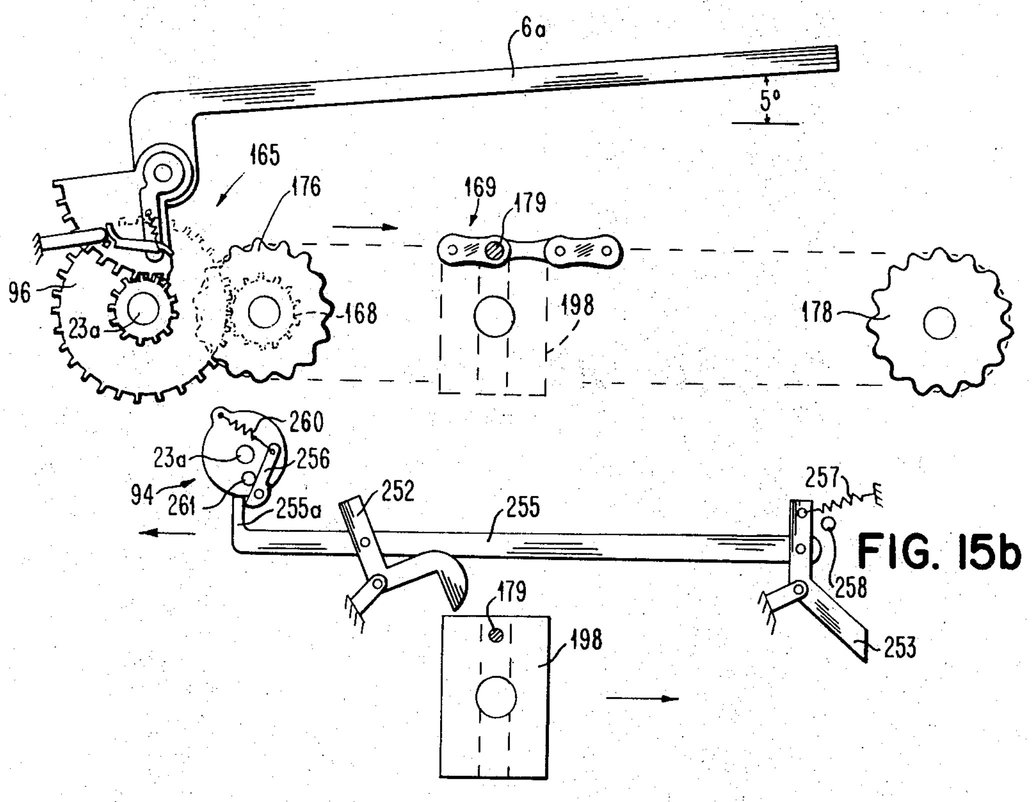

At about 5°, FIGS. 15*a* and 15*b*, dobber 256 moves slide 255 far enough to rotate latch 252 and release block 198. Clutch 165 now drives block 198 through gear 96, gear 168, chain drive 169 and pin 179. Dobber element 256 acts against extension 255*a* of slide 255. Both latches 252 and 253 are ineffective.

Figure 15C:
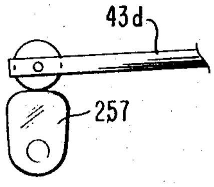

In FIG. 15*c*, cam 257 is of maximum rise with respect to arm 43*d*.

Figure 16A:
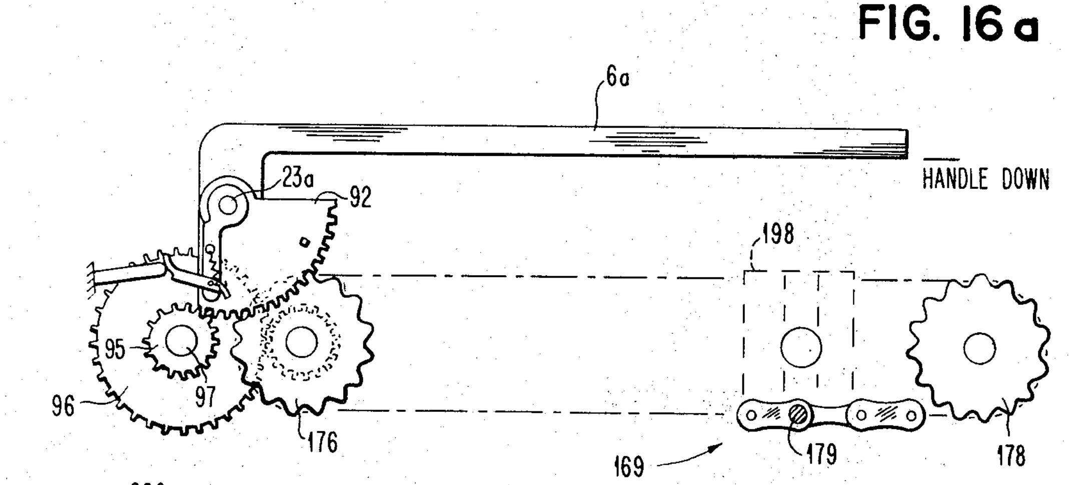
Figure 16B:
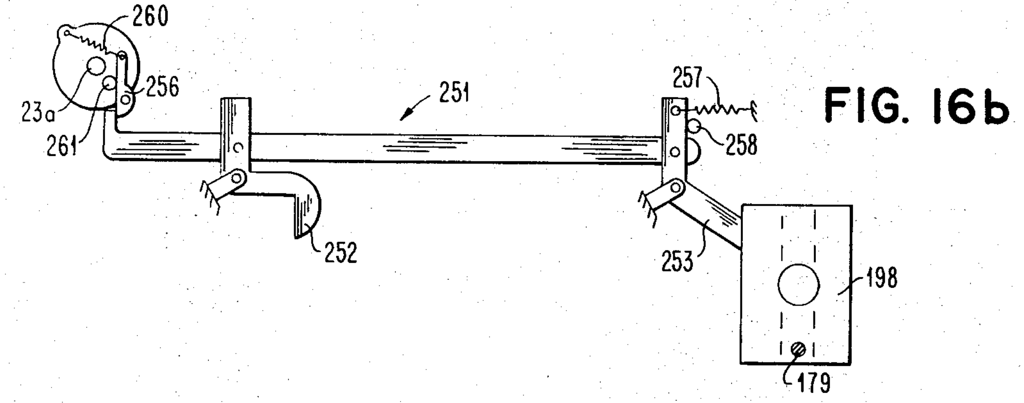

As handle 6*a* reaches it downward limit of travel, FIGS. 16*a* and 16*b*, the drive of block 198 from pin 179 is completed. Block 179 moves under latch 253 which prevents its movement in the opposite direction, until released during a subsequent independent operating cycle. In this manner, pressure is applied and one sweep of drum 11*b* over cards M and D is effected by single control handle 6*a*.

Figure 16C:
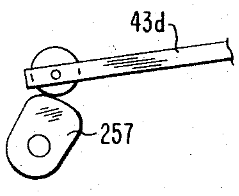

In FIG. 16*c*, cam 257 maintains pressure on the cards through arm 43*d*.

Dobber assembly 94 insures that only one movement of drum 11*b* occurs for each operation of handle 6*a*. Spring 260 and stop 261 cooperate for this purpose to prevent release of latch assembly 251 unless handle 6*a* is raised completely to the vertical position.

While the invention has been particularly shown and described with reference to several embodiments, it will be understood by those skilled in the art that various changes in format and detail may be made without departing from the spirit and scope of the invention.

What is claimed is:

1. Magnetic transfer apparatus, comprising:

retaining means in said apparatus for holding a master record media and a copy record media in superimposed relation in a transfer plane; transfer means, said transfer means having a plurality of associated magnetic transfer elements adjacently arranged, said transfer elements each having a north-south magnetic flux field orientation, and said transfer elements being arranged according to a predetermined north-south pattern with respect to said transfer plane to establish flux transition areas between at least som adjoining pairs of said transfer elements.

scanning means operable to relatively move said transfer means and said media in said transfer plane so that each of a plurality of tangential contact areas in said media is scanned by said transfer means;

transfer element moving means for relaitvely moving a predetermined plurality of transfer elements with respect to individual tangential contact areas in said media during relative scanning movement to insure the passage of predetermined minimum number of flux transition areas with respect to each contact area:

and common control means for actuating said scanning means and said transfer element moving means in a synchronized manner with respect to said media so that the combined scanning and transfer element movement produce a cyclical flux field of gradually changing intensity with respect to each of said contact areas and at least a minimum number of cyclical flux transitions occurs in each contact area to effect transfer of information from said master media to said copy media.

2. The apparatus of claim 1, wherein:

said transfer means comprises an endless belt member having a plurality of magnetic slug elements mounted thereon.

3. The apparatus of claim 1, further comprising:
means associated with said retaining means for receiving and ejecting a master and copy record media simultaneously.

4. The apparatus of claim 3, further comprising:
sensing means for sensing the insertion of a master and copy record media in said apparatus, and including gripper means for gripping said media when fully inserted.

5. The apparatus of claim 1, further comprising:
means associated with said retaining means for receiving and ejecting master and copy record media in respectively separate operations, as required.

6. The apparatus of claim 5, wherein:
at least one of said master and copy record media is provided with a distinguishable characteristic for recognition as a master and a copy media; and further comprising
means in said apparatus responsive to said distinguishable characteristic for operating the respective receiving and ejecting means in said apparatus.

7. The apparatus of claim 1, further comprising:
manually operable means for operator control of said retaining means and said common control means.

8. The apparatus of claim 7, wherein:
said transfer means comprises a drum structure having a plurality of magnetic elements inserted at regular intervals about its periphery, and mounted for movement of said elements across media inserted in said apparatus; and wherein
said common control means comprises a cord and pulley assembly interconnected to said transfer means for operation by said manually operable means to effect scanning of said transfer means across inserted media.

9. The apparatus of claim 8, further comprising:
means mounting said transfer means and said manually operable means associated therewith for linear movement during a scanning operation, said mounting means including coupling means actuated by movement of said manually operable means in one direction to effect movement of said transfer means in the opposite direction across inserted media.

10. The apparatus of claim 8, wherein:
said transfer element moving means comprises rack and gear elements arranged to rotate said drum at a relatively high rate of rotation during a scanning operation so that magnetic elements move in said transfer plane at sufficient speed to insure said minimum number of flux transitions.

11. The apparatus of claim 7, further comprising:
driving elements arranged for driving interconnection under control of said manually operable means to establish movement of both said transfer means and said retaining means with such relative movement establishing movement of said media at one speed through said apparatus and movement of said transfer means at a relatively higher speed to effect transfer of information.

12. The apparatus of claim 11, wherein:
said retaining means comprises pressure rollers cooperatively arranged for driving superimposed master and copy media through said transfer plane; wherein
said transfer means comprises a drum member with a plurality of magnetic inserts; and wherein
said common control means comprises a planetary gear assemblage for operating said retaining means, and said transfer means in the manner set forth.

13. The apparatus of claim 1, further comprising:
means for applying pressure to said master and copy record media to insure firm contact during relative scanning movement of said transfer means and said media.

14. The apparatus of claim 13, further comprising;
a unitary housing means for positioning said retaining, transfer, common control and pressure means in operating relationship; and
a manually operable handle for actuating said pressure means.

15. The apparatus of claim 13, further comprising:
a unitary housing means for positioning said retaining, transfer, common control and pressure means in operating relationship; and
a manually operable means for operator control of said common control means.

16. The apparatus of claim 13, further comprising:
manually operable means for applying said pressure means and operating said moving means in sequence during a single operation.

17. The apparatus of claim 16, further comprising:
a drive assembly connected to drive said transfer means;
latching means for latching said transfer means at each end of a predetermined range of travel; and wherein
said manually operable means comprises a single control structure for
(1) actuating said pressure means,
(2) releasing said latching means and
(3) operating said drive assembly in sequence during movement of said control structure through a selected range of travel.

18. The apparatus of claim 17, further comprising:
prime mover storing means operated prior to said step (1) by movement of said control structure to condition said drive assembly for said step (3).

19. The apparatus of claim 17, further comprising:
a one-way clutch for operating said prime mover means in proper phase during a cycle.

20. The apparatus of claim 17, further comprising:
single-cycle means for establishing only a single cycle of operation of said drive assembly in response to each operation of said control structure.

21. Magnetic transfer apparatus, comprising:
retaining means in said apparatus for holding a master record media and a copy record media in superimposed relation in a transfer plane;
transfer means, said transfer means having a plurality of associated magnetic transfer elements adjacently arranged to establish a succession of substantially linear flux transition areas, said transfer means being mounted for scanning movement across said media in said transfer plane so that each of a plurality of linear tangential contact areas in said media is linearly scanned by said transfer elements;
means for moving said transfer means and said associated elements past said media during scanning movement so that at least a minimum number of flux transitions occurs in each contact area to effect transfer of information from said master media to said copy media;
means associated with said retaining means for receiving and ejecting master and copy record media in respectively separate operations, as required;
entry-exit means for guiding master and copy record media into and out of said transfer plane, and
movable support means associated with said entry-exit means, said support means being movable from a supporting condition to give full support to inserted record media and further movable to a non-supporting condition to facilitate entry of record media in said apparatus.

22. Magnetic transfer apparatus, comprising:
retaining means in said apparatus for holding a master record media and a copy record media in superimposed relation in a transfer plane;
transfer means, said transfer means having a plurality of associated magnetic transfer elements adjacently arranged to establish a succession of substantially linear flux transition areas, said transfer means being mounted for scanning movement across said media in said transfer plane so that each of a plurality of linear tangential contact areas in said media is linearly scanned by said transfer elements;

means for moving said transfer means and said associated elements past said media during scanning movement so that at least a minimum number of flux transitions occurs in each contact area to effect transfer of information from said master media to said copy media;

means associated with said retaining means for receiving and ejecting master and copy record media in respectively separate operations, as required;

master sensing means, including a latch member for recognizing the insertion of a master record media and further including gripper means controlled by said latch means firmly retaining an inserted master record media; and copy sensing means, including latch means for sensing the insertion of a copy record media in said apparatus.

23. Magnetic transfer apparatus, comprising:

retaining means in said apparatus for holding a master record media and a copy record media in superimposed relation in a transfer plane;

transfer means, said transfer means having a plurality of associated magnetic transfer elements adjacently arranged to establish a succession of substantially linear flux transition areas, said transfer means being mounted for scanning movement across said media in said transfer plane so that each of a plurality of linear tangential contact areas in said media is linearly scanned by said transfer elements;

means for moving said transfer means and said associated elements past said media during scanning movement so that at least a minimum number of flux transitions occurs in each contact area to effect transfer of information from said master media to said copy media;

means associated with said retaining means for receiving and ejecting master and copy media in respectively separate operations, as required;

manually operable means movable between two operating conditions; and means responsive to movement of said manually operable means to one of said conditions to eject a copy record media.

24. The apparatus of claim 23, further comprising:

additional manually operable means movable to two operating conditions; and means responsive to movement of said additional manually operable means to one of said conditions for ejecting a master record media.

References Cited

UNITED STATES PATENTS

| | | | |
|---|---|---|---|
| 2,999,908 | 9/1961 | Hoshino et al. ______ | 179—100.2 |
| 3,156,784 | 11/1964 | Kump ____________ | 179—100.2 |

FOREIGN PATENTS

| | | |
|---|---|---|
| 880,570 | 10/1961 | Great Britain. |
| 1,057,791 | 5/1959 | Germany. |

BERNARD KONICK, Primary Examiner

W. F. WHITE, Assistant Examiner

U.S. Cl. X.R.

346—74